United States Patent Office 3,666,612
Patented May 30, 1972

3,666,612
HEAT-SEALABLE COPOLYKETONE FILM
STRUCTURE
Rudolph J. Angelo, Wilmington, Del., assignor to E. I.
du Pont de Nemours and Company, Wilmington, Del.
No Drawing. Filed June 10, 1970, Ser. No. 45,236
Int. Cl. B32b 27/08
U.S. Cl. 161—165                                    7 Claims

ABSTRACT OF THE DISCLOSURE

A heat-sealable copolyketone film structure is provided which consists of a crystalline layer of stratum and an amorphous layer or stratum, each stratum having the composition

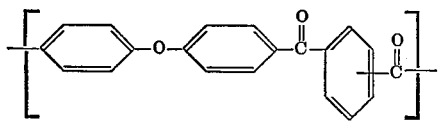

in which the

moiety is either

(T moiety) or

(I moiety), and the T:I ratio varies from 90:10 to 50:50 for the crystalline stratum, and from 90:90 to 0:100 for the amorphous stratum, provided that the T:I ratio of the amorphous stratum is no greater than the T:I ratio of the crystalline stratum; the above film structure is useful as a packaging film.

THE INVENTION

The present invention relates to articles of manufacture. More particularly, the present invention is directed to a novel film structure of copolyketone polymeric material which is useful for packaging applications.

According to the present invention, there is provided a unitary film structure having a plurality of stratums each of copolyketone polymeric composition and wherein adjacent stratums are of different morphology. Specifically, the unitary film structure of the present invention is characterized by at least one crystalline stratum and at least one amorphous stratum wherein each stratum is a copolyketone having the following repeating structural unit:

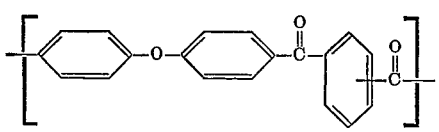  (1)

wherein the

moiety is either

(T moiety) or

(I moiety), and the T:I ratio varies from 90:90 to 50:50 for the crystalline stratum and from 90:10 to 0:100 for the amorphous stratum and the T:I ratio of the amorphous stratum is no greater than that of the crystalline stratum. In its most elementary form, the unitary film structure of the present invention consists of two stratums; one stratum is of crystalline copolyketone polymeric material and the other stratum is of amorphous copolyketone polymeric material, and each stratum is a copolyketone of Formula 1 above. The thickness of the unitary copolyketone film structure of the present invention can vary over a wide range as, for example, from about 0.5 mil to about 10 mils; thinner or thicker films may be obtained as desired.

The unitary film structure of the present invention is composed of copolyketone polymeric material of Formula 1 above. The copolyketone composition is obtained by Friedel-Crafts synthesis such as described in U.S. Pats. Nos. 3,065,205, 3,441,538 and 3,442,857 or various modifications of such syntheses. The copolyketone composition is preferably extruded into film form utilizing melt-extruding techniques.

The specific unitary film structure of the present invention characterized by a plurality of stratums wherein adjacent stratums are each of different morphology, i.e., one stratum being crystalline and its adjacent stratum being amorphous, are prepared by any of the following exemplary methods.

In one method, a crystalline copolyketone film structure of Formula 1 above having a T:I ratio of 90:10 to 50:50, either unoriented or oriented, is treated so as to destroy the crystalline nature of at least one of the surfaces. This may be done by flame treating the film structure as by passing the film structure over a cool drum or roll while simultaneously impinging a flame against the exposed surface of the advancing film structure. The resulting unitary film structure is characterized by a crystalline layer or stratum (the cooled side of the film) and an amorphous stratum (the flame treated side of the film).

In another method, a film of copolyketone of Formula 1 above having a T:I ratio of 90:10 to 0:100 is extruded onto at least one surface of a crystalline film of copolyketone of Formula 1 above having a T:I ratio of 90:10 to 50:50, and the combined materials are passed through a nip to press them together. The operation should be carried out with the crystalline film against a cooled drum or roll so as to preserve the crystalline nature thereof and to provide a means for quenching the amorphous film that is melt-extruded thereon thereby to prevent it from crystallizing.

In yet another method, crystalline copolyketone film as defined above and at least one amorphous unoriented copolyketone film as defined above are combined under the influence of heat and pressure to form the film structure of the invention. Preferably, the operation is carried out under pressure in a nip formed by one cold drum or roll which contacts the crystalline copolyketone film and one heated drum or roll which contacts the amorphous copolyketone film.

As indicated above, the crystalline stratum of the film structure may be either oriented or unoriented. The film structure of this invention having an oriented crystalline stratum possesses superior tensile properties, while that having an unoriented crystalline stratum has superior dimensional stability.

The novel film structure of the invention is useful as a packaging film for foods, metal parts, etc. The particular advantages of this film lie in its outstanding dimensional stability at temperatures normally encountered in cooking various foods, the consequence of which is that it is especially adapted for use in fabrication of cook-in-package containers. Other advantages are that it is heat-sealable, colorless, transparent, and resistant to heat, solvents, acids, bases, fats, etc. The bond between the crystalline and amorphous stratums or layers is excellent, and the film readily survives exposure to water and high humidity. The film structure exhibits good barrier properties, that is, low permeability to water vapor and oxygen.

The copolyketone film of the invention is also suited for use as insulation on electrical conductors. When slit into narrow tapes, it can be spirally wound, customarily overlapped, onto conductors and then heat-sealed in place.

The principle and practice of the present invention will now be illustrated by the following examples which are only exemplary thereof and it is not intended that the invention be limited thereto since modifications in technique and operation will be apparent to anyone skilled in the art.

The following test and evaluation procedures were used in the examples below:

Inherent viscosity: The inherent viscosity is measured at 23° C. at a concentration of 0.5% by weight of the copolymer in concentrated sulfuric acid. To calculate inherent viscosity, the viscosity of the polymer solution is measured relative to that of the acid alone, and calculated from the following equation:

$$\text{Inherent viscosity} = \frac{\text{natural logarithm} \frac{\text{viscosity of solution}}{\text{viscosity of acid solvent}}}{C}$$

where C is the concentration expressed in grams of polymer per 100 milliliters of solution.

EXAMPLE 1

A copolyketone resin of Formula 1 above having a T:I ratio of 70:30 was prepared from diphenyl ether, terephthaloyl chloride and isophthaloyl chloride with aluminum chloride catalyst in ortho-dichlorobenzene. After isolating and purifying the resin it had an inherent viscosity of 0.85 (0.5% by weight solution in concentrated sulfuric acid at 23° C.).

The above copolyketone resin was extruded into film with a ¾-in. extruder and 4-in. die. The screw, barrel, and die were chromium plated, the breaker plate was made of Hastelloy C, and the filter pack of nickel wire screen. Film was extruded with a barrel temperature of 365–370° C., a die temperature of 372° C., and a screw speed of 50 r.p.m., at pressures of 800 to 1400 p.s.i. The film obtained was tough and flexible, and was 5 to 15 mils thick. It had an inherent viscosity of 0.97.

Sheets of the above as-cast extruded film were bilaterally stretched 3× by 3×. Each sheet was clamped into a pantograph stretcher, preheated at 177° C. for 2.5 minutes, and stretched at 177° C. simultaneously in both machine and transverse film directions at linear extension rates of 10,000% per minute. (A 3× stretch means that the final film measurement in that dimension is three times the original film measurement in the same dimension.) The resulting oriented films were tough and flexible, and were 0.5 to 2.5 mils thick.

Sheets of the above bilaterally oriented film were placed between two asbestos gaskets, clamped securely into metal frames, and heat treated at 275° C. in an oven under nitrogen for 30 minutes, in order to anneal, crystallize and heat-set them. The resulting films were tough, flexible and transparent.

A sheet of the above bilaterally oriented/crystallized film was clamped into a metal frame, and a gas flame was contacted with one surface of the film. The flame contact at any given point on the film was about one second or less. Two small specimens of the treated film were superimposed, treated side to treated side, and heat sealed at 275° C. under 300 p.s.i. for 30 sec.; the specimens were bonded together well with no film wrinkling or distortion. Under the same heat sealing conditions, superimposed specimens of the same bilaterally oriented/crystallized film, but which had not been flame treated, showed no evidence of bonding; at 300° C. under 300 p.s.i. for 30 sec., slight bonding was observed, and at 325° C. under 300 p.s.i. for 30 sec. good bonding occurred, but under these last two conditions the films shrank and distorted.

EXAMPLE 2

In this example, a film structure of the invention was prepared and heat-sealed to another copolyketone film in a single operation.

Onto a first copolyketone layer of the bilaterally oriented/crystallized film of Example 1 was placed a second copolyketone layer of unoriented/amorphous film (copolyketone of Formula 1 above having a T:I ratio of 70:30), and on the latter another layer like the first. The assembly was heat-sealed at 250° C. under 300 p.s.i. for either 30 sec. or 5 sec.; in both cases, the structure was bonded together well with no film wrinkling or distortion.

In a control wherein the second layer was omitted, the structure could not be heat-sealed together at either 250° C. or 275° C. under 300 p.s.i. for 30 sec.; at 300° C. under 300 p.s.i., for 30 sec. slight bonding occurred, and at 325° C. under 300 p.s.i. for 30 sec. good bonding occurred, but under these conditions the films shrank and distorted.

EXAMPLE 3

In this example, a film structure of the invention was prepared and heat-sealed to another copolyketone film in a single operation.

Onto a first copolyketone layer of the unoriented/crystallized film of Example 1 was placed a second copolyketone layer of unoriented/amorphous film (copolyketone of Formula 1 above having a T:I ratio of 70:30), and on the latter another layer like the first. The assembly was heat-sealed at 275° C. under 300 p.s.i. for 30 sec.; the structure was bonded together well with no film wrinkling or distortion.

In a control wherein the second layer was omitted, the structure could not be heat-sealed together at 275° C.; at 300° C. under 300 p.s.i. for 30 sec. slight bonding occurred, and at 325° C. under 300 p.s.i. for 30 sec. good bonding occurred, but under these last two conditions the films shrank and distorted.

EXAMPLES 4–6

Laminar structures were prepared by combining films A of unoriented, crystalline copolyketone of Formula 1 above having a T:I ratio of 70:30 with either a film B of unoriented amorphous copolyketone of Formula 1 having a T:I ratio of 70:30 (Example 4), a similar film B with a T:I ratio of 50:50 (Example 5), or a similar film B with a T:I ratio of 30:70 (Example 6). Each structure was made by combining the two films in a press at 175° C. for 10 sec. (Example 4) or at 200° C. for 15 sec. (Examples 5 and 6) under about 940 p.s.i. release sheets of tetrafluoroethylene/hexafluoropropylene copolymer were placed over the platens of the press to prevent the copolyketone films from sticking to them. The laminar structures were clear, smooth and free of bubbles.

For each example, strips of film one-half-inch wide were cut, two strips were superimposed B side to B side, and heat-sealed in a Precision Heat Sealer at 285–290° C. under 90 p.s.i. for 2 seconds. The sealed specimens were smooth and free of bubbles. The strength of the seal was measured on a tensile testing apparatus. The results were as follows:

| Example: | Seal strength (average of 5) [1] |
|---|---|
| 4 | 868 |
| 5 | 812 |
| 6 | 1258 |

[1] Grams/inch of width.

EXAMPLES 7–9

Examples 4–6 were repeated, but in place of the stated film A there was used film A of 3× by 3× biaxially oriented, crystalline copolyketone of Formula 1 having a T:I ratio of 70:30. The T:I ratios of the B layers were again 70:30 (Example 7), 50:50 (Example 8), and 30:70 (Example 9). The results of the heat seal tests were as follows:

| Example: | Seal strength (average of 5) [1] |
|---|---|
| 7 | 564 |
| 8 | 1172 |
| 9 | 1056 |

[1] Grams/inch of width.

What is claimed is:

1. An article of manufacture comprising a unitary film structure comprising a plurality of stratums each stratum being of the same copolyketone polymeric composition and wherein adjacent stratums are of different morphology, one of said adjacent stratums being crystalline and the other being amorphous, said copolyketone having the following recurring structural unit:

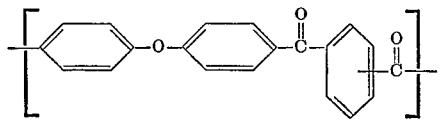

wherein the

moiety is either

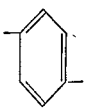

(T moiety) or

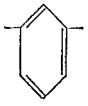

(I moiety), and the T:I ratio varies from 90:10 to 50:50 for the crystalline stratum and from 90:10 to 0:100 for the amorphous stratum, and T:I ratio of the amorphous stratum is no greater than that of the crystalline stratum.

2. The copolyketone film structure of claim 1 wherein the crystalline stratum is of oriented copolyketone polymeric material.

3. The copolyketone film structure of claim 1 having a thickness between about 0.5 mil and about 10 mils.

4. The copolyketone film structure of claim 1 having two stratums.

5. The copolyketone film structure of claim 1 comprising three stratums wherein the two outer stratums are of crystalline copolyketone polymeric composition and the inner stratum intermediate of said two outer stratums is of amorphous copolyketone polymeric composition.

6. The copolyketone film structure of claim 5 having a thickness between about 0.5 mil and about 10 mils.

7. The article of claim 1 wherein all of said stratums have the same T:I ratio.

References Cited

UNITED STATES PATENTS

| 3,441,538 | 4/1969 | Marks | 260—49 |
| 3,065,205 | 11/1962 | Bonner, Jr. | 260—63 K |
| 3,385,825 | 5/1968 | Goodman et al. | 260—61 |

FOREIGN PATENTS

| 1,117,354 | 6/1968 | Great Britain | 264—80 |

PHILIP DIER, Primary Examiner

U.S. Cl. X.R.

161—258; 260—63; 264—80